Jan. 7, 1930. L. H. BENNION 1,742,300
METHOD AND APPARATUS FOR USE IN MOLDING SHOE PARTS
Filed Dec. 3, 1926   3 Sheets-Sheet 1

INVENTOR.
Leslie Hugh Bennion
By his Attorney,
Nelson N. Howard

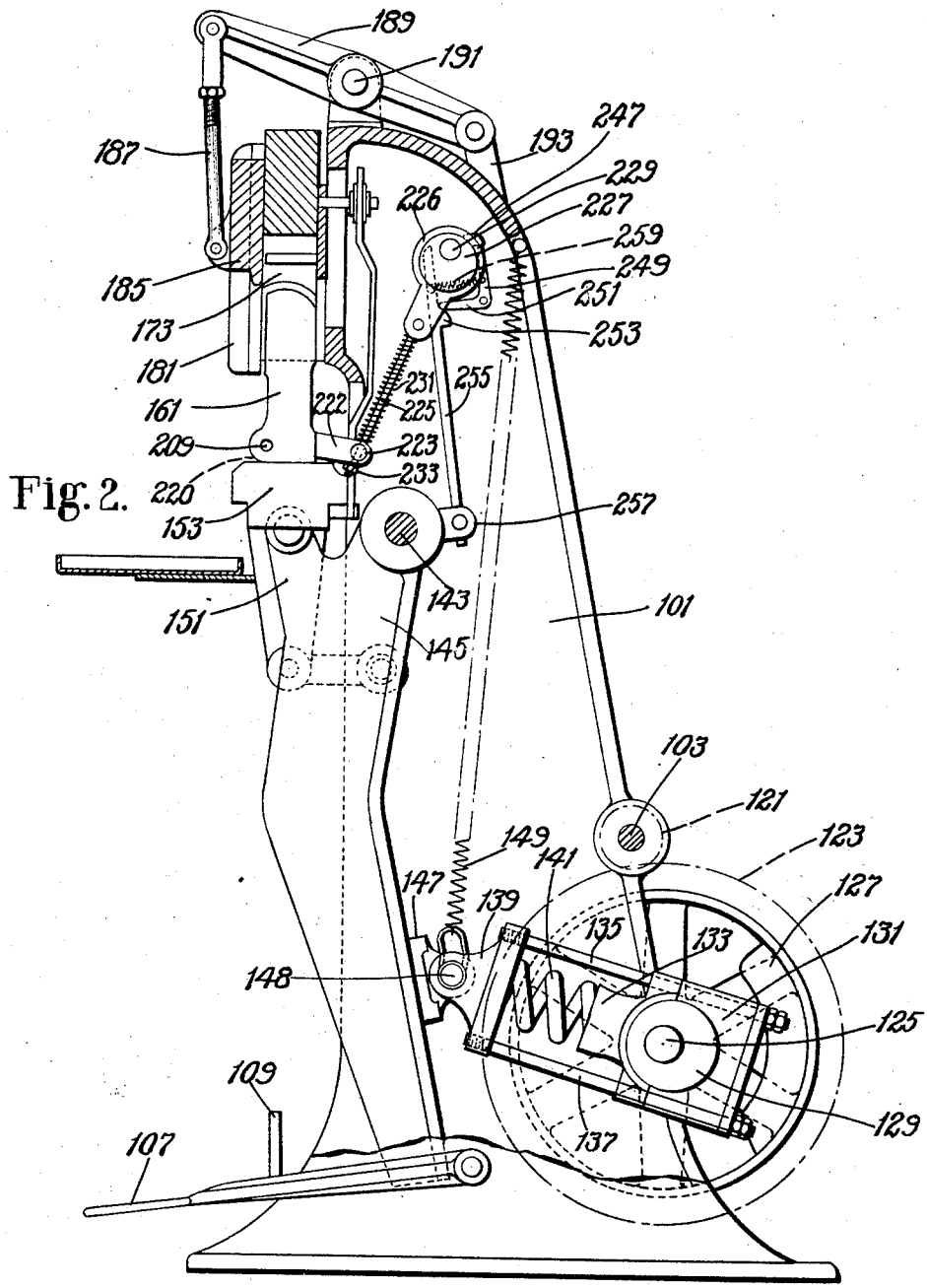

Jan. 7, 1930. L. H. BENNION 1,742,300
METHOD AND APPARATUS FOR USE IN MOLDING SHOE PARTS
Filed Dec. 3, 1926 3 Sheets-Sheet 3
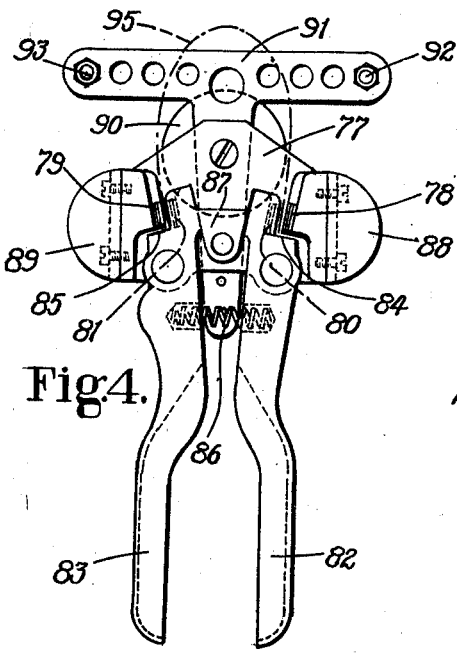
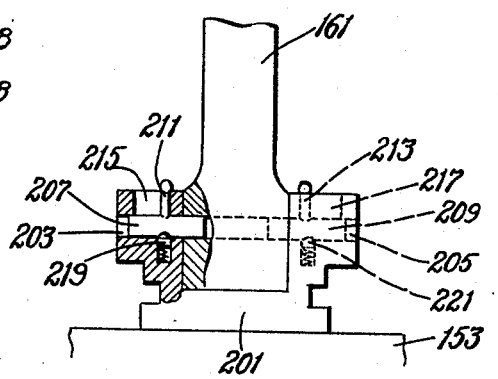
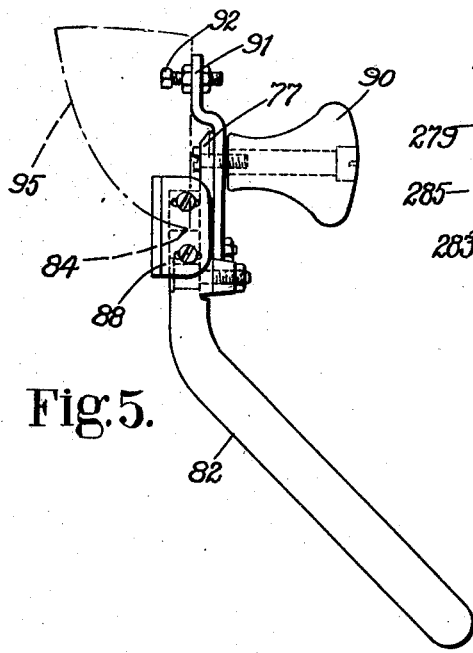
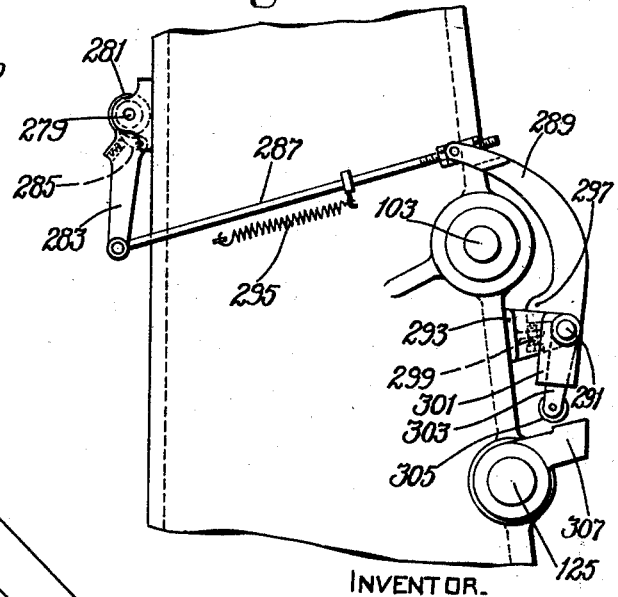

Patented Jan. 7, 1930

1,742,300

UNITED STATES PATENT OFFICE

LESLIE HUGH BENNION, OF LEICESTER, ENGLAND, ASSIGNOR TO UNITED SHOE MACHINERY CORPORATION, OF PATERSON, NEW JERSEY, A CORPORATION OF NEW JERSEY

METHOD AND APPARATUS FOR USE IN MOLDING SHOE PARTS

Application filed December 3, 1926, Serial No. 152,493, and in Great Britain December 24, 1925.

This present invention relates to improvements in methods and apparatus for use in molding shoe parts. In its illustrated embodiment the invention is herein shown and described in its application to the molding of counter-stiffeners, but it is to be understood that in various respects the invention is not limited to such use.

At present it is usual to mold counter-stiffeners, commonly called "counters", for shoes in a machine which first presses the blank to give it the desired general shape and which thereafter forms a flange along one margin or along a part thereof. Owing to the fact that the first operation must distort the blank in different planes, and that the molds do not grip all parts of the blank at the same time and with equal pressure, it frequently happens that the initial pressure of the molds displaces certain parts, for example, the wings, of the blank before they can be gripped adequately, the result being that the flange-forming is effected along a line other than that desired. For this and other reasons it is often found necessary to re-mold the counter. This not only involves loss of time but the resultant counter frequently is thereby rendered defective, and, during the manufacture of the shoe in which it is incorporated, bends or even cracks along the line of first flange-forming; further, the first flange-forming operation sometimes leaves a ridge that is not entirely removed by the remolding operation, which ridge makes the subsequent conforming of the upper to correct shape more difficult and so involves further loss of time.

In view of the above, it is an object of the invention to provide a method and means by the use of which the time required for the operation of counter-molding may be reduced, and the operation may be rendered more certain and effective in its results.

In one aspect, the present invention resides in an improved method of operating upon counter blanks which comprises manually presenting a blank to the molds of a molding machine, initiating an operation of the molds upon the blank, maintaining manual control of the blank until it has been gripped by the molds in order to prevent displacement of the blank, releasing the blank from manual control, and then proceeding with the molding operation upon the blank.

Considering the invention in its machine aspect, one feature consists in the provision of a manually operable blank-feeding device by which an operator can present a blank to a counter-molding machine in proper relation to the molds of the machine and control the position of the blank until there is no danger of displacement of the blank by the molds. To this end, in the illustrated embodiment of the invention, the blank-feeding device comprises a plate provided with manually operable gripper jaws for holding the ends of the wings of a blank in predetermined position, and locating members for positioning the blank relatively to the molds of the machine.

In accordance with other features of the invention, improved mechanism is provided for tilting forwardly one of the molds after operations performed upon a blank to place the blank in position to be removed from the machine by means of stripping mechanism arranged for operation in timed relation to the operations of the molds, additional mechanism being provided for preventing initiation of molding operations during the operation of the stripping mechanism.

These and other objects and features of the invention will be apparent from the following description taken in conjunction with the accompanying drawings.

In the drawings,

Fig. 2 shows a side elevation of the machine partly in section;

Fig. 4 shows a rear elevation of a blank presenter;

Fig. 5 shows a side elevation of the presenter;

Fig. 6 is a detail of the mounting for the male mold; and

Fig. 7 is a detail of certain parts of the clutching mechanism.

Figure 1:
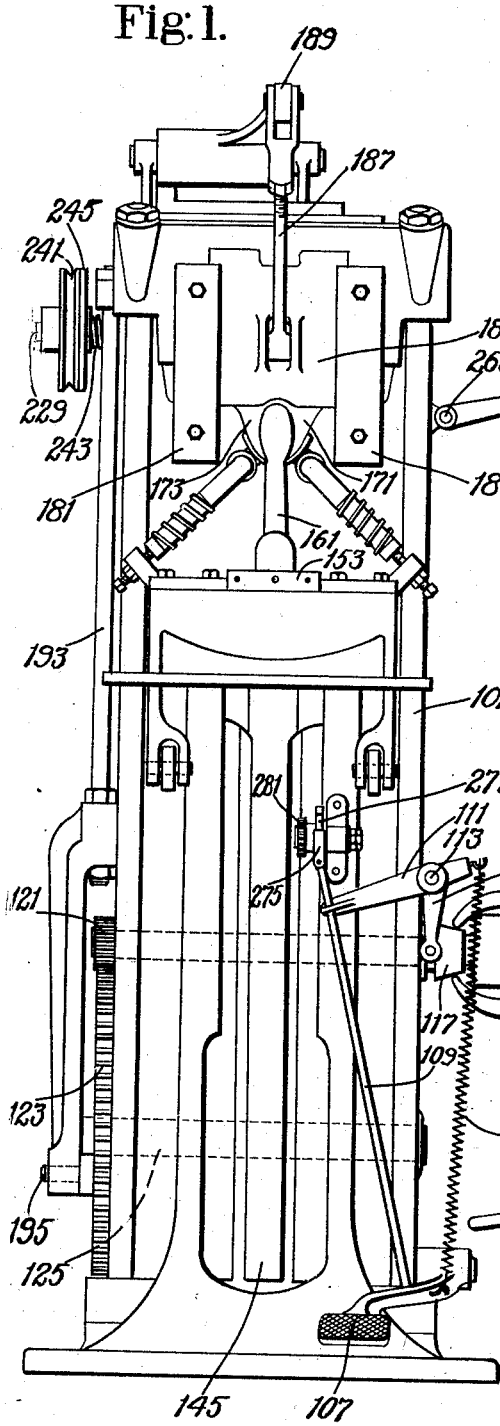
Fig. 1 shows a front elevation of an illustrative machine embodying the invention.

Referring to Figs. 4 and 5 the blank presenter, by which counter blanks are presented to the illustrated counter-molding machine, comprises a baseplate 77 having fixed to it on one face (for convenience referred to as the rear face, that is, the face which in use will be next the machine) two outer jaws 78 and 79, the jaw faces forming with the baseplate 77 an angle that is slightly obtuse. Pivoted to the baseplate are two levers 82 and 83, respectively, formed with inner jaws 80 and 81, which are arranged to co-operate with the adjacent outer jaws 78 and 79. The inner jaws 80, 81 are also formed respectively with portions 84, 85 extending in opposite directions and approximately at right angles to the gripping faces of the jaws to form stop faces for the ends of the wings of a blank. The levers 82, 83 are normally pressed apart by a spring 86. The levers are bent forward (Fig. 5) and are so located relatively to one another that both can be readily grasped by one hand of an operator. A stop 87 fixed to the baseplate limits the opening movement of both the levers.

Extending from the baseplate 77, and in approximately the same plane, on the same side of the lever pivots as the jaws is a T-shaped bracket 91, adjustably secured to the baseplate. On the crossbar of the T are adjustable stops 92 and 93 extending rearwardly, the crossbar having a series of holes in any pair of which the stops may be positioned in order to assist in properly locating the presenter relatively to a mold of the machine. On opposite sides of the baseplate 77 are brackets 88 and 89 mounted for adjustment forwardly and rearwardly and extending rearwardly to form abutments to assist in locating the presenter relatively to the molds. Secured to the baseplate on its front side is a knob 90 by means of which an operator can press the presenter and gripped blank towards the molds.

In inserting a counter blank into the presenter the blank (shown at 95) is bent into horseshoe-shape and the end portions of the wings or opposite ends of the blank are inserted between the jaws of the presenter until the ends of the blank strike the aforementioned stop faces 84 and 85, the flange margin, i. e., the margin of the blank that is to form the flange of the molded counter at the ends of the wings resting on the baseplate, and the heel end portion of the blank resting on the crossbar of the T-shaped bracket 91. Thus the margin of the blank is definitely positioned in the presenter at several separated points. In this way, each blank in turn will be definitely and similarly located both peripherally and heightwise of itself in the presenter. After a blank is located in the presenter, the handles 82, 83 are then pressed towards one another and the inner jaws grip the wings of the blank against the outer jaws. The operator, holding the presenter jaws closed by one hand, advances the presenter to a counter-molding machine, such, for example, as the illustrated machine which is of the type disclosed in United States Letters Patent No. 467,473, granted January 19, 1892, on application of W. C. Stewart, to which Letters Patent reference may be had for detailed disclosure of the construction and operation of parts not fully described herein. Referring briefly to the operation of the illustrated machine before considering it more in detail, the operator places the part of the blank projecting from the presenter around the male mold 161 (Fig. 1) of the machine, pressing, by applying his other hand to the knob 90, the aforementioned rearwardly-extending adjustable stops 92, 93 and bracket abutments 88, 89 against adjacent portions 171 and 173 of the female mold so that the blank enters between the molds a definite distance at all points; he also holds the presenter so that the blank is correctly positioned peripherally of the male mold by making sure that the crossbar of the T-shaped bracket is horizontal. The treadle of the machine is then depressed and the molds operate to grip and press the blank, the gripping action of the presenter jaws on the wings of the blank preventing the wings from being tilted inwardly as has been the tendency heretofore, and the pressure exerted by the operator upon the knob 90 against the forward thrust of the machine preventing the heel end of the blank from being forced outwardly as was also the tendency. When the molds have gripped the blank, the operator releases the presenter jaws and removes the presenter after which a flange former operates to give a double wipe to the projecting flange of the blank.

Figure 3:
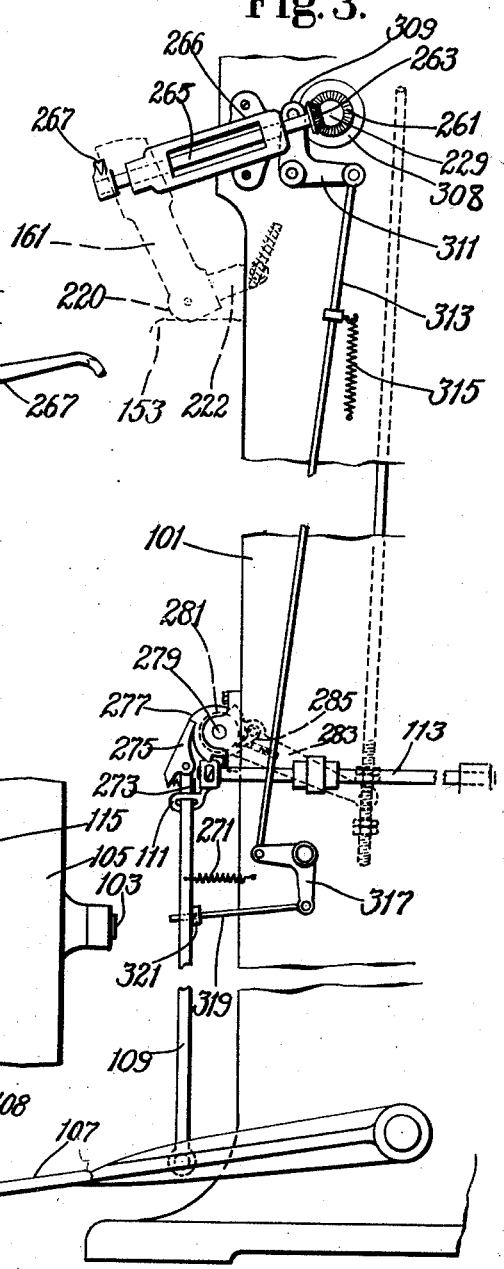
Fig. 3 shows a side view similar to Fig. 2, slightly enlarged, of the treadle and mechanism connected thereto.

Referring now to Figs. 1 to 3, the illustrated machine comprises a frame 101 which carries a main shaft 103 on the right end of which (as viewed from the front, see Fig. 1) is mounted a constantly rotating pulley 105 that is adapted to be clutched to the shaft 103. To this end a treadle 107 is operatively connected, by means of mechanism comprising a link 109, to an arm 111 fixed to the front end of a rock-shaft 113 mounted in the frame of the machine, and another arm 115 is fixed to the rear end of the rockshaft, its free end being forked to embrace a coned sleeve 117 slidable on the main shaft 103 to cause the pulley 105 to be clutched to and unclutched from the shaft 103. A spring 108 normally holds the treadle raised and the pulley unclutched. The left end of the main shaft 103 carries a pinion 121 meshing with a gear wheel 123 fixed to a driving shaft 125, the gear wheel carrying in an offset position a heavy weight 127 (Fig. 2) and the arrangement being such that when the pulley is unclutched the driving shaft, and incidentally the main shaft, and the connected parts will move backwardly under the influence of the weight and a spring 149 to be described and come to rest always in substantially the same position.

The driving shaft 125 has fixed to it an eccentric 129 embraced by an eccentric strap which is composed of two blocks 131, 133. Bolts 135, 137 pass through the blocks and through an end-piece 139, a heavy compression spring 141 separating the end-piece from the blocks. Thus the blocks 131, 133 are frictionally held to the driving shaft 125 and will be rotated with it, unless held against rotation.

The frame 101 carries a pivot 143 upon which is mounted a heavy rocking lever 145 having on its rear side a guideway for a sliding block 147. The block 147 is pivoted at 148 to the end-piece 139 and a spring 149 is attached to the block and to the frame of the machine so that there is a tendency for the block and end-piece to be held in uppermost position as indicated in Fig. 2. The rocking lever 145 has a forward extension 151 which carries a table 153 upon which is supported, as hereinafter described, a counter-shaped male mold 161.

Mounted in the frame of the machine and arranged to co-operate with the male mold is a floating female mold comprising two co-operating members 171 and 173 (Fig. 1), which, when the male mold is in operative position, close about the male mold to grip and press the sides of the counterblank to give it the desired rounded shape.

The front of the machine carries guides 181 and 183 between which is mounted for vertical sliding movement a flange former 185 (best shown in Fig. 2) which is reciprocated after the molds have gripped the blank to wipe over the male mold a portion of the flange margin of the blank that extends forwardly from the molds and thus to form an inturned flange. The flange former is operated by means of an adjustable rod 187 pivoted to the forward end of a lever 189 which in turn is pivoted between its ends at 191 to the machine frame. The rear end of the lever 189 is pivotally connected by means of a rod 193 to an eccentric pin 195 (Fig. 1) carried by the gear wheel 123 on the driving shaft 125.

Upon depression of the treadle 107 the pulley 105 is clutched to the main shaft 103 so that that shaft and the driving shaft 125 are rotated.

Owing to the fact that the eccentric strap blocks 131, 133 are frictionally gripped to the eccentric 129, rotation of the driving shaft 125 rocks the end-piece 139 downwardly and so moves the sliding block 149 down to the bottom of its travel and in so doing rocks the bottom end of the rocking lever 145 forwardly about the pivot 143 and thus moves the male mold upwardly into the female mold. On further rotation of the driving shaft, the sliding block 147 being at the bottom of its travel and therefore preventing further rotation of the end-piece 139, the blocks 131 and 133 slip on the eccentric 129 and consequently rotation of the eccentric moves the end-piece 139, block 147 and lower end of the rocking lever 145 radially of the shaft 125, the arrangement being such that the male mold is first given a further or secondary upward movement during which the female mold (having closed during the first main upward movement) yields upwardly. Immediately after this further upward movement the flange former 185 is operated. Continued rotation of driving shaft 125 reciprocates the flange former so that until the machine is stopped these movements are continuously repeated. When the treadle is released and the pulley is unclutched from the main shaft the spring 149 in conjunction with the weight 127 lifts the sliding block 147, provided that when stoppage occurs the weight and spring are acting together, which will be the case if the unclutching of the pulley occurs so that stoppage takes place when the flange former is in uppermost position, and, owing to the grip of the eccentric blocks 131 and 133 on the eccentric 120, turns back the driving shaft 125 somewhat.

The male mold 161 is, as already stated, mounted upon the table 153. It is so pivoted that it can be rocked forwardly away from the female mold, as indicated in Fig. 3. Referring to Fig. 6, the table 153 carries a bifurcated bracket 201, the bifurcations of which are provided with transverse guideways 203, 205 within which are slidably mounted pivot pins 207 and 209. The pivot pins can be moved towards and from one another by means of lugs 211 and 213, that project through slots 215 and 217 respectively, in the bifurcations of the bracket. Spring-pressed poppets 219 and 221 are adapted to co-act with depressions cut in the pivot pins 207 and 209 to retain the latter in position. The stem of the male mold fits between the bifurcations of the bracket 201 and is bored to receive the pivot pins 207 and 209, as shown in Fig. 6. It may be readily freed by separating the pivot pins. The front of the base of the stem of the male mold is curved about the axis of the pivot pins, as indicated at 220 in Figs. 2 and 3, so that it can rock forwardly. The proportions of the bracket 201 and of lower part of the stem of the male mold are such that when the male mold is in molding position (see Fig. 2) the lower face of the stem contacts with the adjacent face of the bracket so as to take the downward pressure due to the molding operation, thus relieving the pivot pins 207, 209 of shearing stress.

In order to rock the male mold automatically in timed relation to the molding movements of the molds, in order to place the molded counter in position for removal, mechanism now to be descirbed is provided. Upon the base of the stem of the male mold is a short rearwardly extending arm 222 (Fig. 2) carrying a bolt 223 through which passes a rod 225 connected at its upper end to an eccentric strap 226 surrounding an eccentric 227 upon a shaft 229 mounted in the frame of the machine and driven intermittently, as will be hereinafter described. A compression spring 231 surrounds the rod 225 and tends to depress the arm 222 into contact with a nut 233 on the end of the rod so that the male mold is normally swung into upright position, as indicated in Fig. 2. Upon the left end of the shaft 229 (Fig. 1) a pulley 241 is rotatably mounted and is constantly driven, in the illustrated example, from the line shafting that drives the machine pulley 105. Keyed for sliding movement on the shaft 229 and constantly pressed into driving engagement with the pulley 241 by a spring 243 is a friction disk 245 which tends to drive the shaft 229. The shaft 229, however, carries a nose piece 247 (Fig. 2), fast on a disk (not shown) secured to the shaft, said nose piece being normally held stationary by the upright arm 249 of a bell-crank lever pivoted to the machine frame. The horizontal arm 251 of the bell-crank lever lies above a toe 253 upon a rod 255, the lower end of which is pivoted between ears 257 carried by the rocking lever 145. The upper end of the rod 255 is connected by a spring 259 to the upright arm 249 of the bell-crank lever. The arrangement is such that the shaft 229 is normally held from rotation but when the rocking lever 145 is swung rearwardly after the unclutching of the pulley from the shaft the toe 253 is raised to rock the bell-crank lever and release the nose 247 so that the shaft 229 can rotate; consequently the male mold, under the action of the eccentric 227, is rocked outwardly to the position indicated in Fig. 3, in which position the molded stiffener can be readily removed from the male mold. The shaft 229 in its rotation carries the nose piece 247 against the upper end of the rod 255 forcing the latter to the left in Fig. 2 to release the bell-crank lever from the toe 253, whereupon the upright arm 249 is pulled back by the spring 259 into position to contact with the nose piece 247 when it rotates into the position shown in Fig. 2. Thus the shaft 229 is stopped after one revolution. When the nose piece, in revolving, ceases to contact with the rod 255 the latter is pulled back by the spring 259 until the side of the toe 253 contacts with the end of the horizontal arm 251, and when the machine is started again and the rocking lever 145 rocks forwardly the rod 255 is lowered and the toe is once more positioned under the horizontal arm 251 ready to lift it once again when the clutch is disengaged.

In order to strip the molded stiffener automatically from the male mold when the latter is rocked outwardly as just described the following mechanism is provided. Secured to the end of the shaft 229 opposite the pulley 241 is a bevel gear 261 (Fig. 3) which meshes with another bevel gear 263 secured to a picker shaft 265 mounted in a bracket 266 on the machine frame and extending forwardly and downwardly. Fast to the forward end of the picker shaft 265 is a picker arm 267 (Figs. 1 and 3) so positioned and timed that, as the shaft 265 is rotated, its point will pass under the flange of the counter, to remove the latter from the male mold 161 when the latter is rocked forwardly, and to throw it into a chute or other receptacle, not shown.

It is considered desirable that the flange former should operate twice in molding the flange on each counter since it is considered that a better result is obtained by two wiping actions at reduced pressure than by a single wiping action at the heavy pressure necessary to secure proper molding at a single wipe. Such a double movement can readily be given without unduly prolonging the molding operation if it is certain that the blank is correctly positioned between the molds, and consequently a remolding of the blank will not be required as is so frequently the case at present. In the illustrated machine, means is provided for effecting automatic stoppage of the machine after a double wiping action of the flange former. To this end, the treadle rod 109 is not connected directly to the clutch-operating lever 111 but passes through an elongated slot therein (Fig. 3), being forced rearwardly by a spring 271. A catch piece 273 pivoted on the rod 109 overlies the lever 111 when the rod is so held rearwardly by the spring 271 so that upon depression of the treadle the lever 111 will be depressed to cause clutching of the machine. In order to permit unclutching of the pulley even if the treadle is held depressed, means are provided for disengaging the catch piece 273 from the lever 111. This result is obtained by swinging the rod 109 forwardly (see Fig. 3) whereupon the spring 108 (Fig. 1) will rock the lever 111 upwardly, the catch piece 273 passing through the slot in the lever. The means for swinging the treadle rod 109 forwardly comprises a latch 275 pivoted to the upper end of the treadle rod and spring-pressed into engagement with a cam wheel 277 having four cam teeth thereon. This cam wheel is secured near one end of a short shaft 279 to the other end of which is secured a ratchet wheel 281 (Figs. 1, 3 and 7). Pivoted to the shaft 279 is a pawl arm 283 (Fig. 7) which carries a pawl 285 spring-pressed into engagement with the ratchet wheel 281.

The lower end of the pawl arm is pivoted to the forward end of link 287 the other end of which is adjustably pivoted to the upper end of a rock lever 289 which is fixed to a spindle 291 mounted in a bracket 293 on the machine frame. A spring 295 connected to the link 287 and to the machine frame normally holds the pawl arm 283 and rock lever 289 forwardly, the actual position of these parts being determined by the contact of a lug 297 on the lever with an adjustable stop 299 on the bracket 293. Fixed to and projecting downwardly from the spindle 291 is a U-shaped lever 301 between the arms of which is positioned a lever 303 mounted for oscillation on the spindle 291 and carrying a roll 305.

The driving shaft 125 has fixed to it immediately below the roll 305 a striker 307 which, during each rotation of the driving shaft, strikes the roll 305, forces the lever 303 against the bottom of the U of the lever 301, rocks the lever 289 rearwardly and so retracts the pawl 285. As soon as the striker has passed the roll, the parts are returned by the spring 295 to their former position and the pawl 285 moves the ratchet wheel 281 through an angle of 45°. Thus, in two rotations of the driving shaft, during which two reciprocations of the flange former take place, the cam wheel 277 is rotated through an angle of 90° or by the amount of one cam tooth. Just before the completion of the second movement the latch 275 is forced by the cam tooth outwardly far enough to swing the rod 109 forwardly to disengage the catch piece 273 from the lever 111 and so permit the latter to rise under action of the spring 108 to cause unclutching of the pulley from the shaft. Thus the machine is automatically stopped after two movements of the flange former.

In order to prevent starting of the machine when the male mold is not vertically beneath the female mold, the following mechanism is employed. Upon the shaft 229 there is fixed also a disk 308 (Fig. 3) which has an arcuate depression cut in its periphery within which, when the machine is running and the shaft 229 is stationary, rests a cam roll 309 carried upon the vertical arm of a bell crank lever 311. The horizontal arm of this lever is connected by a rod 313, urged downwardly so as to cause engagement of the cam roll 309 and disk 308 by a spring 315, to a second bell-crank lever 317 pivoted to the lower portion of the machine frame. To this lever 317 there is connected a rod 319 which passes through a hole in the treadle rod 109 and has a collar 321 bearing against the rear of the rod 109, the arrangement being such that upon rotation of the picker shaft 265, which occurs when the molding devices are inoperative and the male mold 161 is swung forward as indicated in Fig. 3, the rod 109 is swung forwardly, so that the catch piece 273 cannot engage with and move the lever 111 to clutch the pulley.

From the foregoing description of the machine and of the presenter, the mode of operation will have become apparent, but it may be briefly summarized as follows:

The blank having been presented as already described, the treadle 107 is depressed, causing the molds to grip and press the blank, the presenter preventing displacement thereof in the manner above described. After the molds have fully gripped the blank, the operator releases the blank, removes the presenter and proceeds with the insertion of another blank therein. After the removal of the presenter, the flange former 185 operates to give a double wipe to the projecting flange margin of the blank.

When the flange former has risen for the second time, the cam wheel 277 swings the treadle rod 109 forwardly and permits the lever 111 to rise to disengage the clutch, and upon the consequent rearward movement of the rocking lever 145 the upright arm 249 of the bell-crank lever is rocked to release the shaft 229 which then makes one revolution. During this rotation of the shaft 229 the male mold 161 is rocked outwardly (Fig. 3), the picker arm 267 rotates to remove the counter from the male mold, the latter is swung back to upright position (Fig. 2) and the nose piece 247 contacts with the upright arm 249, whereupon the shaft 229 stops. As soon as the shaft 229 commenced to rotate the cam roll 309 was forced out of the depression in the disk 307 and, by the mechanism already described, the treadle rod 109 was swung forwardly to prevent starting of the machine until the cam roll 309 again entered its depression on the completion of the rotation of the shaft 229 with the consequent return of the various parts to their initial position.

Having described the invention, what I claim as new and desire to secure by Letters Patent of the United States is:—

1. A manually operable device for feeding blanks to a molding machine, comprising means for supporting an edge of a blank, means under manual control for engaging and holding the ends of the blank in a predetermined position, and means for locating the device with relation to a part of the molding machine.

2. A manually operable device for feeding blanks to a molding machine, which comprises means for supporting one edge of a blank, means for gripping the ends of the blank, and means for locating the device with relation to a part of the molding machine.

3. A device for feeding blanks to a molding machine, which comprises means for engaging one edge of the blank thereby to support it, means for engaging and holding the ends of the blank under manual control, means for locating the device relatively to a part of the molding machine, and means for holding the device against the forward thrust of the machine.

4. A device for feeding blanks to a counter-molding machine comprising a plate provided with manually operable gripper jaws for holding the ends of the wings of a blank in predetermined position, and locating members for positioning the blank relatively to the molds of the machine.

5. A device for presenting blanks to a molding machine, comprising a plate having an abutment for supporting one edge of a blank, grippers for holding under manual control the ends of the blank, gages associated with the plate for locating the device with relation to the molding machine, and means for holding the device against the forward thrust of the machine.

6. A manually operable device for presenting counter blanks to a molding machine, comprising means for supporting one edge of a counter blank, means for holding the ends of the wings of the blank in a predetermined position in the device, and means for locating the device with relation to the molding machine.

7. A manually operable blank presenter for a counter-molding machine, comprising an abutment for supporting an edge of a blank, means for holding the wings of the blank in a predetermined position under manual control, and a gage for locating the presenter with relation to the molds of the machine.

8. A manually operable blank presenter for a counter-molding machine, comprising a plate provided with abutments for supporting the edges of the wings of a blank in a predetermined position relatively to the plate, manually operable gripping jaws for holding the blank, and gages carried by the plate for locating the presenter with relation to the molding machine.

9. A manually operable blank presenter for a counter-molding machine, comprising a plate for supporting a margin of a counter blank, abutments on the plate for locating the ends of the wings of the blank, means for holding the wings in located position, and a gage for locating the presenter with relation to a part of the molding machine.

10. A manually operable blank presenter for a molding machine, comprising means for supporting a margin of a counter blank, means under manual control for holding the wings of the blank, and means for locating the blank in the machine heightwise and peripherally of itself.

11. A manually operable blank presenter for a molding machine, comprising means for supporting a margin of a counter blank at a plurality of separated points, means for locating the ends of the wings of the blank in the presenter, and gages for assisting in the location of the presenter with relation to a part of the machine.

12. A manually operable blank presenter for a molding machine, comprising means for supporting a margin of a counter blank at a plurality of separated points, means for locating the ends of the wings of the blank in the presenter, gages for assisting in the location of the presenter with relation to the molds of the machine, and means for holding the presenter against the forward thrust exerted by the molds.

13. A manually operable blank presenter for counter-molding machines, comprising a plate for engaging a margin of a blank, stationary jaws mounted on the plate, movable jaws pivotally mounted on the plate co-operating with the stationary jaws for holding the ends of the wings of a blank inserted between the jaws, the movable jaws having faces for determining the position of the ends of the blank relatively to the plate, and gages mounted on the plate for locating the presenter with relation to the molds of a molding machine.

14. That improvement in methods of molding counters, which comprises presenting a blank under manual control to the molds of a counter-molding machine, initiating an operation of the molds upon the blank while maintaining manual control of the blank until the molds have gripped the blank, thereby preventing displacement of the blank, and completing the molding operation upon the blank.

15. That improvement in methods of molding counters, which comprises presenting under manual control a blank to the molds of a counter-molding machine, initiating an opation of the molds, holding the blank against the forward thrust of the molds until the blank has been gripped by the molds thus preventing undesired displacement of the blank, releasing the blank from manual control, and continuing with the molding operation.

16. That improvement in methods of molding counters by the use of a machine having male and female molds and a flange former, which comprises presenting under manual control a blank to the male mold, initiating an operation of the molds upon the blank, maintaining manual control of the blank during part of the operation of the molds to prevent displacement of the blank, releasing the blank from manual control, completing the molding operation upon the blank, and operating the flange former to form a flange on the counter.

17. A machine of the class described comprising molds for operating upon counter blanks, and a manually operable presenter for presenting a blank to the molds and having means for co-operating with one of the molds to determine the position in which the counter is presented to the molds.

18. A machine of the class described comprising male and female molds for operating upon counter blanks, and a blank presenter manually operable to move a blank into position upon one of the molds and to hold the blank against the forward thrust of the machine during an operation of the molds.

19. In a counter-molding machine, molds for pressing a blank, means for actuating the molds, manually operable mechanism for initiating operations of the mold actuating means, means for automatically discontinuing operations of the actuating means after operations performed upon the blank, means for removing the completed counter from the machine after the actuating means has come to rest, and means for preventing effective operation of the manually operable mechanism during the operation of the removing means.

20. In a machine for molding counters, mechanism for operating upon blanks comprising male and female molds and a flange former, manually operable means for initiating operations of said mechanism, means for automatically discontinuing operations of said mechanism, means for removing counters from the machine, means for initiating operation of the removing means after the blank operating mechanism has come to rest, and means for preventing actuation of the manually operable means to initiate an operation of said mechanism during the operation of the removing means.

21. A machine for molding counters comprising male and female molds, a flange former, means for operating the molds and flange former to press a blank and form a flange thereon, means for stopping the operating means automatically at the end of operations performed upon the blank, means for removing the completed blank from the machine, means for automatically initiating operation of the removing mechanism after the stoppage of the operating means, and means for discontinuing the operation of the removing mechanism after the blank has been removed from the machine.

22. A machine for molding counters comprising male and female molds, a flange former, means for operating the molds and flange former to press a blank and form a flange thereon, means for stopping the operating means automatically at the end of operations performed upon the blank, means for moving the male mold into inoperative position, a picker for removing the completed blank from the male mold, means for automatically initiating operation of the picker after the stoppage of the operating means, means for discontinuing the operation of the picker after the blank has been removed from the machine, and means for preventing the restarting of the operating means while the picker is in operation.

In testimony whereof I have signed my name to this specification.

LESLIE HUGH BENNION.